US012800919B2

(12) United States Patent
Strandborg et al.

(10) Patent No.: US 12,800,919 B2
(45) Date of Patent: Nov. 17, 2026

(54) DYNAMIC LIGHTGUIDE FOR DISPLAY

(71) Applicant: Varjo Technologies Oy, Helsinki (FI)

(72) Inventors: Mikko Strandborg, Hangonkylä (FI); Kai Inha, Helsinki (FI); Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 139 days.

(21) Appl. No.: 18/653,275

(22) Filed: May 2, 2024

(65) Prior Publication Data

US 2025/0341715 A1 Nov. 6, 2025

(51) Int. Cl.

*G02B 27/00* (2006.01)
*G06F 3/01* (2006.01)
*G09G 3/00* (2006.01)

(52) U.S. Cl.

CPC ......... *G02B 27/0093* (2013.01); *G06F 3/013* (2013.01); *G09G 3/001* (2013.01); *G09G 2320/02* (2013.01); *G09G 2354/00* (2013.01)

(58) Field of Classification Search

CPC .... G02B 27/0093; G06F 3/013; G09G 3/001; G09G 2320/02; G09G 2354/00
See application file for complete search history.

(56) References Cited

U.S. PATENT DOCUMENTS 9,335,548 B1 * 5/2016 Cakmakci .......... G02B 27/0172
10,670,929 B2 * 6/2020 Shi ........................ G02F 1/1362
12,106,734 B1 * 10/2024 Strandborg .............. G09G 5/10
2019/0318677 A1 * 10/2019 Lu ....................... G02B 27/0093
2020/0152105 A1 * 5/2020 Ishii ................... G02B 27/0172
2023/0244077 A1 * 8/2023 Kollin ................ G02B 27/0081
359/630

* cited by examiner

*Primary Examiner* — Bryan Earles
(74) *Attorney, Agent, or Firm* — ZIEGLER IP LAW GROUP, LLC.

(57) ABSTRACT

Disclosed is a display apparatus with gaze-tracking means; a light source per eye having pixels, a lightguide per eye comprising lightguide segments that are individually controllable, wherein lightguide segments correspond to groups of pixels of the light source; and processor(s) is/are configured to: determine at least one of: a gaze direction of a user, a position of a pupil relative to an imaginary plane that spans across a field of view of the light source, an orientation of the pupil relative to an optical axis of the field of view; and control at least one of the plurality of lightguide segments to direct light, received from a corresponding group of pixels of the light source, towards the pupil of the given eye.

12 Claims, 4 Drawing Sheets

DYNAMIC LIGHTGUIDE FOR DISPLAY

TECHNICAL FIELD

The present disclosure relates to display apparatuses incorporating dynamic lightguides for display. The present disclosure also relates to methods incorporating dynamic lightguides for display.

BACKGROUND

Nowadays, there is an increased demand for developments in image displaying technology. Such a demand is quite high and critical in case of evolving technologies such as immersive extended-reality (XR) technologies which are being employed in various fields such as entertainment, training, medical imaging operations, navigation, and the like. An XR device (for example, such as a head-mounted display (HMD) device) often utilises a display for presenting a visual scene of an XR environment to a user of the XR device.

However, the existing image displaying technology has several problems associated therewith. Firstly, the display of the XR device are utilised for viewing from extremely close distances (typically, a few centimeters from user's eyes) through a lens arrangement, which often results in a significant variation in a viewing angle across a surface of the display. Due to this, certain viewing angles of the user's eyes that are near an optical axis of the lens arrangement are considerably straight, but when the user's eyes are looking/gazing towards an edge or a corner of the display, viewing angles increase significantly. This poses various challenges for the display when displaying images to the user, and often results in problems such as a light leakage, an incorrect colour reproduction, an uneven light emission across the surface of the display. Moreover, an exact position of the user's eyes varies both across different users, and along different gaze movements. This variability further complicates a design of the display that suits to the different users.

Secondly, the display is typically designed to emit light uniformly at a wide angle towards the user's eye when displaying images. However, this is not an optimal situation, and causes difficulties not only in terms of an accuracy of colour separation in the images, but also because a setting in which the images are presented (to the user's eyes) is a closed chamber of the XR device, whose internal walls tend to reflect off light emitted from pixels located towards edges of the display. In such a case, unwanted reflections, refractions, and/or diffraction due to said light occur, irrespective of light-absorbing capabilities of coatings present on the internal walls and a high brightness level of the display. This has been discussed hereinbelow in conjunction with FIG. 1 (Prior Art).

Referring to FIG. 1 (Prior Art), illustrated is a typical scenario of emitting light 102 from a light source 104 towards a given eye 106. With reference to FIG. 1, for the given eye 106, an optical chamber 108 of a display apparatus is shown to comprise the light source 104, and a lens 110 (depicted using a dotted pattern). As shown, when the light 102 (depicted using dashed-line arrows) received from pixels of the light source 104 is emitted towards the given eye 106, only some portion of the light 102 is actually received by a pupil 112 of the given eye 106 at correct (namely, intended) angles, and a remaining portion of the light 102 is not received by the pupil 112 due to reflections of the light 102 by internal walls of the optical chamber 108. Moreover, some portion of the light 102 incident towards the pupil 112 at grazing angles. This potentially causes light leakage, ghosting effects and incorrect colour reproduction in images displayed at the light source 104, and uneven light emission across a display area of the light source 104.

Furthermore, some existing displays that are designed specifically for XR use cases, include an adjustment of a black matrix so that an optimal viewing direction for each region of the display is adjusted towards a center of the display. However, such existing display panels are static and do not take into account a changing viewing condition and gaze direction of the user's eyes. Additionally, said existing displays are often produced on special orders, which can be expensive and have limited availability.

Therefore, in light of the foregoing discussion, there exists a need to overcome the aforementioned drawbacks.

SUMMARY

The present disclosure seeks to provide a display apparatus and a method which facilitate a simple, yet accurate and reliable way for directing light towards a pupil of a given eye in real time or near-real time, thereby improving an overall visual quality of images being displayed to the given eye via a light source. The aim of the present disclosure is achieved by a display apparatus and a method which incorporate dynamic lightguide for display, as defined in the appended independent claims to which reference is made to. Advantageous features are set out in the appended dependent claims.

Throughout the description and claims of this specification, the words "comprise", "include", "have", and "contain" and variations of these words, for example "comprising" and "comprises", mean "including but not limited to", and do not exclude other components, items, integers or steps not explicitly disclosed also to be present. Moreover, the singular encompasses the plural unless the context otherwise requires. In particular, where the indefinite article is used, the specification is to be understood as contemplating plurality as well as singularity, unless the context requires otherwise.

DETAILED DESCRIPTION OF EMBODIMENTS

Figure 1:
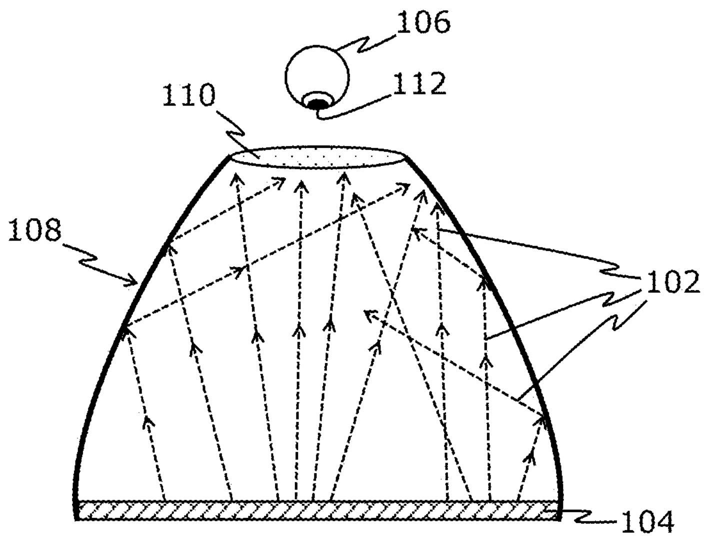
FIG. 1 (PRIOR ART)
FIG. 1 (Prior Art) illustrates a typical scenario of receiving light from a light source towards a given eye.

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, an embodiment of the present disclosure provides a display apparatus comprising:

gaze-tracking means;

a light source per eye, having a plurality of pixels;

a lightguide per eye, arranged on an optical path of the light source, the lightguide comprising a plurality of lightguide segments that are individually controllable, wherein the plurality of lightguide segments correspond to a plurality of groups of pixels of the light source; and at least one processor configured to:

process gaze-tracking data, collected by the gaze-tracking means, to determine at least one of: a gaze direction of a given eye of a user, a position of a pupil of the given eye relative to an imaginary plane that spans across a field of view of the light source, an orientation of the pupil of the given eye relative to an optical axis of the field of view of the light source; and control at least one of the plurality of lightguide segments to direct light, received from a corresponding group of pixels of the light source, towards the pupil of the given eye, based on the at least one of: the gaze direction of the given eye, the position of the pupil, the orientation of the pupil.

In a second aspect, an embodiment of the present disclosure provides a method comprising:

processing gaze-tracking data, collected by gaze-tracking means, to determine at least one of: a gaze direction of a given eye of a user, a position of a pupil of the given eye relative to an imaginary plane that spans across a field of view of a light source per eye, an orientation of the pupil of the given eye relative to an optical axis of the field of view of the light source, wherein the light source has a plurality of pixels; and controlling at least one of a plurality of lightguide segments of a lightguide per eye to direct light, received from a corresponding group of pixels of the light source, towards the pupil of the given eye, based on the at least one of: the gaze direction of the given eye, the position of the pupil, the orientation of the pupil, wherein the lightguide is arranged on an optical path of the light source, the lightguide comprising the plurality of lightguide segments that are individually controllable, wherein the plurality of lightguide segments correspond to a plurality of groups of pixels of the light source.

The present disclosure provides the aforementioned display apparatus and the aforementioned method which facilitate a simple, yet accurate and reliable way for directing the light towards the pupil of the given eye in real time or near-real time by way of using the lightguide, thereby improving an overall visual quality of images being displayed to the given eye via the light source. Once it is known that where the pupil of the given eye is located, the at least one processor controls the at least one of the plurality of lightguide segments accordingly to direct the light towards the pupil. Beneficially, when at least one lightguide segment is controlled in the aforesaid dynamic manner, a maximum amount of the light from the light source is emitted (namely, focused) towards the pupil of the given eye. This is beneficial because a close proximity of the light source to the pupil results in significant angular variation in a location of the pupil when observed from a perspective of a single pixel of the light source, and thus it is advantageous to redirect the light towards the pupil. By focusing an emissive lobe of the light in this manner, a majority of the light is aimed towards the pupil, enhancing a uniform illumination and visual clarity. Resultantly, this enables in displaying images to the given eye in a highly accurate and realistic manner as each portion of an image is perceived by the pupil of the given eye with an accurate colour reproduction, a high resolution, a high contrast, a high brightness, minimal/no visual artifacts, an improved clarity/sharpness, and the like. In addition to this, controlling the at least one of the plurality of lightguide segments in the aforesaid manner facilitates in minimising reflections, diffractions, and/or refractions of the light within an optical chamber of the display apparatus. Moreover, directing the light towards the pupil of the given eye in the aforesaid manner is well-suitable for a scenario where a depth of the optical chamber is relatively less, for example, when pancake optics is employed in the display apparatus. The display apparatus and the method are simple, robust, fast, reliable, support real-time directing of the light towards the pupil, and can be implemented with ease.

Throughout the present disclosure, the term "display apparatus" refers to specialized equipment that is capable of displaying images. These images are to be presented to a user of the display apparatus. It will be appreciated that the term "display apparatus" encompasses a head-mounted display (HMD) device and optionally, a computing device communicably coupled to the HMD device. The term "head-mounted display" device refers to specialized equipment that is configured to present an XR environment to the user when said HMD device, in operation, is worn by the user on his/her head. The HMD device is implemented, for example, as an XR headset, a pair of XR glasses, and the like, that is operable to display a visual scene of the XR environment to the user. Examples of the computing device include, but are not limited to, a laptop, a desktop, a tablet, a phablet, a personal digital assistant, a workstation, and a console. The term "extended-reality" encompasses virtual reality (VR), augmented reality (AR), mixed reality (MR), and the like.

Throughout the present disclosure, the term "light source" refers to an equipment from which light emanates. Particularly, the plurality of pixels of the light source emanate the light. Optionally, the light source is implemented as a display. Examples of the display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, the light source is implemented as a projector. Examples of the projector include, but are not limited to, an LCD-based projector, an LED-based projector, an OLED-based projector, an LCOS-based projector, a Digital Light Processing (DLP)-based projector, and a laser projector. Displays and projectors are well-known in the art. It will be appreciated that the plurality of pixels could be arranged, for example, in a rectangular two-dimensional (2D) grid, a polygonal arrangement, a circular arrangement, an elliptical arrangement, or similar, on the light source. Typically, the light source comprises millions of pixels.

Throughout the present disclosure, the term "lightguide" refers to a specialised equipment that, in operation, directs (namely, guides) an optical path of light emanating from (a given pixel of) the light source. It will be appreciated that when the lightguide is arranged on the optical path of the light source (i.e., when the lightguide is arranged in front of a light-emitting surface of the light source), the lightguide receives the light emanating from the given pixel thereat, and directs the light accordingly towards the pupil of the given eye, as discussed later in detail.

Optionally, the lightguide is implemented as a liquid-crystal (LC) device. The term "liquid-crystal device" refers to a device that enables in directing the light passing therethrough using an LC medium. The LC device can be understood to steer the light passing therethrough towards the pupil of the given eye. It will be appreciated that the LC device optionally comprises the LC material which is electrically controlled to direct the light received from the given pixel of the light source towards the pupil of the given eye. When the LC device is in operation, optical properties (for example, such as a refractive index, a birefringence, and the like) of the LC material and/or an orientation of LC molecules within the LC material are electrically controlled, in order to direct the light received from the given pixel towards the pupil of the given eye. Electrically controlling the LC material to redirect light incident thereupon is well-known in the art. The technical benefit of implementing the lightguide as the LC device is that the LC material in the LC device could be easily and conveniently controlled (electrically) to direct the light towards a particular (namely, intended) direction to reach towards the pupil of the given eye. This may facilitate in reducing reflections of the light within an optical chamber of the display apparatus, and thus an overall amount of the light entering the pupil of the given eye would be maximised. This potentially enables in displaying highly accurate and realistic images to the given eye, via the light source. Furthermore, the LC device could be constructed with smaller dimensions, which makes it suitable for use in devices having a limited space, for example, such as the HMD device.

In some implementations, the light source is implemented as a liquid-crystal display (LCD), and the lightguide is implemented as at least one LC layer. Optionally, in such implementations, the at least one LC layer could be integrated into the LCD amongst other layers of the LCD, for example, such as a colour filter, an encapsulation glass layer, a backplane built on substrates, a protection film, an optical diffuser, a polariser, and the like. Alternatively, in such implementations, the at least one LC layer is arranged in front (namely, on top) of a light-emitting surface of the LCD. In an example implementation, when the light source is implemented as a projector, the lightguide itself could be employed as a projection screen.

Optionally, the LC device comprises a first LC layer and a second LC layer, wherein the first LC layer, when addressed, directs light received thereat from a given pixel towards a first direction, and wherein the second LC layer, when addressed, directs light received thereat from the first LC layer towards a second direction, the second direction being orthogonal to the first direction. Optionally, in this regard, the first layer and the second layer are collectively addressable to direct the light towards the pupil of the given eye. The technical benefit implementing the LC device in the aforesaid manner may allow for precise control over a direction of propagation of the light emanating from the given pixel. By individually addressing each LC layer, the LC device could selectively manipulate an optical path of the light. Moreover, an orthogonal redirection of the light provided by the second LC layer of the LC device may potentially facilitate in achieving complex light steering required for at least some pixels of the light source. Furthermore, implementing the LC device in the aforesaid manner is easy, and enables in achieving a faster response time whilst having a low power consumption.

Throughout the present disclosure, the term "lightguide segment" refers to an individual portion of the lightguide that is (electrically) controllable to direct an optical path of light emanating from pixels of a given group in the light source, towards the pupil of the given eye. Notably, a given lightguide segment corresponds to a given group of pixels of the light source.

Optionally, a group of pixels that corresponds to a given lightguide segment is in a form of M×N pixels, wherein M and N are integers that are larger than or equal to 8. As an example, the given lightguide segment may corresponds to a group of 32×32 pixels of the light source. It will be appreciated that when the lightguide corresponds to a group of M×N pixels as described hereinabove, a time taken for directing the light towards the pupil of the given eye is significantly reduced. This is because a single lightguide segment is controlled to direct the light received from an entirety of the given group of pixels towards the pupil of the given eye, as compared to a case when the single lightguide segment would be controlled to direct the light received from a single pixel only. This may be due to the fact that a given pixel and neighbouring pixels of the given pixel would highly likely emanate light in (almost) a same direction. Thus, the light emanating from the given pixel and the neighbouring pixels can be easily controlled by utilising the single (corresponding) lightguide segment.

Notably, the at least one processor controls an overall operation of the display apparatus. The at least one processor is communicably coupled to at least the gaze-tracking means, the light source, and the lightguide (particularly, to the plurality of lightguide segments of the lightguide). Optionally, the at least one processor is implemented as a processor of the computing device. Alternatively, optionally, the at least one processor is implemented as a cloud server (namely, a remote server) that provides a cloud computing service.

Throughout the present disclosure, the term "gaze-tracking means" refers to specialized equipment for detecting and/or following the given eye of the user. It will be appreciated that by detecting and/or following the given eye of the user, the gaze-tracking means is employed to track at least one of: a gaze of the given eye, a position of the pupil of the given eye, an orientation of the pupil of the given eye. The term "gaze direction" refers to a direction in which the user is gazing. The gaze direction may be indicated by a gaze vector. The gaze-tracking means could be implemented as contact lenses with sensors, cameras monitoring a position, an orientation, a size and/or a shape of the pupil of the given eye, and the like. The gaze-tracking means are well-known in the art.

It will be appreciated that the gaze-tracking data is collected repeatedly by the gaze-tracking means throughout a given session of using the display apparatus. Optionally, when processing the gaze-tracking data, the at least one processor is configured to employ at least one of: an image processing algorithm, a feature extraction algorithm, a data processing algorithm. Determining the at least one of: the gaze direction of the given eye, the position of the pupil, the orientation of the pupil, allows the at least one processor to ascertain where the user is looking/gazing within the field of view of the light source.

It will be appreciated that a distance between the given eye of the user and the light source may change with a change in a position of the given eye. Said distance could be determined using the gaze direction of the given eye and an interpupillary distance between a first eye and a second eye of the user, for example, by employing a triangulation technique. Thus, when determining the position of the pupil relative to the imaginary plane by processing the gaze-tracking data, the at least one processor could utilise said distance between the given eye of the user and the light source. The technical benefit of defining the position of the pupil relative to the imaginary plane is that in some implementations, there could be additional optical elements (such as lenses and mirrors) that are arranged on an optical path between the light source and the lightguide. Thus, defining the position of the pupil relative to the imaginary plane takes care of all implementations in which the additional optical elements are arranged on the aforesaid optical path and in which there are no additional optical elements. The imaginary plane may be understood to be a plane intersecting with a cone-like shape of the field of view of the light source. The pupil need not necessarily lie on the imaginary plane. The field of view of the light source is considered to be from a perspective of the given eye. Furthermore, since the tracked orientation of the pupil of the given eye, the gaze direction of the given eye, and an angular extent of the field of view of the light source are pre-known to the at least one processor, the orientation of the pupil relative to the optical axis could be easily determined.

Notably, in order to direct the light towards the pupil of the given eye, the at least one processor could easily ascertain where the pupil of the given eye is located with respect to the light source, by utilising the at least one of: the gaze direction, the position of the pupil, the orientation of the pupil. Once it is known that where the pupil of the given eye is located, the at least one processor is optionally configured to generate a control signal accordingly, for controlling the at least one of the plurality of lightguide segments to direct the light towards the pupil of the given eye. It is to be noted that at least some of the plurality of lightguide segments may be controlled to direct the light, received from corresponding groups of pixels, towards the pupil, while a remainder of the plurality of lightguide segments may be controlled to direct the light, received from corresponding groups of pixels, away from the pupil (as discussed later in detail).

Beneficially, when the at least one of the plurality of lightguide segments is controlled in the aforesaid dynamic manner, a maximum amount of the light from the light source is emitted (namely, focused) towards the pupil of the given eye. This is beneficial because a close proximity of the light source to the pupil results in significant angular variation in a location of the pupil when observed from a perspective of a single pixel of the light source, and thus it is advantageous to redirect the light towards the pupil. By focusing an emissive lobe of the light in this manner, a majority of the light is aimed towards the pupil, enhancing a uniform illumination and visual clarity. Resultantly, this enables displaying images to the given eye in a highly accurate and realistic manner as each portion of an image is perceived by the pupil of the given eye with an accurate colour reproduction, a high resolution, a high contrast, a high brightness, minimal/no visual artifacts, an improved clarity/sharpness, and the like. In addition to this, controlling the at least one of the plurality of lightguide segments in the aforesaid manner facilitates in minimising reflections, diffractions, and/or refractions of the light within an optical chamber of the display apparatus.

In an embodiment, the at least one processor is configured to:

- detect when the orientation of the pupil is greater than a pre-determined angle;
- when it is detected that the orientation of the pupil is greater than the pre-determined angle,
  - determine a gaze position in the imaginary plane spanning across the field of view of the light source, based on the gaze direction of the given eye;
  - identify at least one group of pixels of the light source whose pixels' angular distance from the gaze position is greater than a pre-determined angular distance; and
  - control at least one lightguide segment corresponding to said at least one group of pixels to direct light, received from said at least one group of pixels, away from the pupil of the given eye.

In this regard, when it is detected that the orientation of the pupil is greater than the pre-determined angle, it means that the gaze direction of the given eye is significantly away from a central region of the field of view of the light source i.e., the user may highly likely be gazing/looking towards a peripheral region in the field of view of the light source (for example, such as a corner region in said field of view or a region towards an edge of the light source). Thus, a region of interest in the imaginary plane whereat the user is focusing or is more likely to focus, would lie in the peripheral region. Optionally, an angular extent of the region of the interest lies in a range of 0 degrees from the gaze position to 2-50 degrees from the gaze position. Optionally, the pre-determined angle lies in a range of 20 degrees to 45 degrees with respect to the optical axis of the field of view of the light source.

Optionally, when determining the gaze position, the at least one processor is configured to map the gaze direction of the given eye onto the imaginary plane spanning across the field of view of the light source. The term "gaze position" refers to a position in the imaginary plane onto which the gaze direction of the given eye is mapped. The gaze position may, for example, be at a centre of the imaginary plane, at a point in a top-left region of the imaginary plane, at a point in a bottom-right region of the imaginary plane, or similar.

It will be appreciated that since a location of the gaze position, locations of all pixels of the light source, and the angular extent of the field of view of the light source are pre-known to the at least one processor, an angular distance of each of the pixels from the gaze position could be easily and accurately determined by the at least one processor. In this regard, those pixels whose (determined) angular distance from the gaze position is greater than the pre-determined angular distance, are identified as said pixels belonging to the at least one group. It is to be noted that when an angular distance of a given pixel from the gaze position is greater than the pre-determined angular distance, it means that said pixel may highly likely be located significantly far from the gaze position (namely, away from the region of interest), and thus directing light emanating from said given pixel towards the pupil may not be beneficial even though an overall amount of the light entering the pupil would be maximised. This is because when said light is directed towards the pupil, said light would travel in a grazing angle to reach the pupil, which could potentially lead to unwanted reflections, diffractions, and/or refractions of said light within the optical chamber of the display apparatus, thereby deteriorating an overall viewing experience of the user. Therefore, in order to mitigate this potential problem, the at least one lightguide segment corresponding to the at least one group of pixels is controlled in a manner that the light received from said pixels is directed away from the pupil. In an example, the at least one group of pixels may be located towards a left edge of the light source, and the gaze direction of the given eye may be towards a right edge of the light source. Optionally, the light received from said at least one group of pixels is directed away from the pupil at an angle that is greater than or equal to the orientation of the pupil with respect to the optical axis. Additionally, optionally, the light received from said at least one group of pixels is directed towards an inner surface of the optical chamber of the display apparatus, wherein the light is absorbed by a coating on the inner surface of the optical chamber. Optionally, the pre-determined angular distance lies in a range of 40 degrees to 90 degrees with respect to the gaze position. This has been also illustrated in conjunction with FIGS. 7A and 7B, for sake of better understanding and clarity.

In an alternative embodiment, the display apparatus further comprises at least one lens arranged on the optical path of the light source, wherein the lightguide is arranged between the light source and the at least one lens, wherein the at least one processor is configured to:

detect when the orientation of the pupil is greater than a pre-determined angle;

when it is detected that the orientation of the pupil is greater than the pre-determined angle, determine a gaze position in the imaginary plane spanning across the field of view of the light source, based on the gaze direction of the given eye;

identify at least one group of pixels of the light source whose pixels' angular distance from the gaze position is greater than a pre-determined angular distance; and control at least one lightguide segment corresponding to said at least one group of pixels to direct light, received from said at least one group of pixels, towards a centre of the at least one lens.

In this regard, instead of directing the light (received from said at least one group of pixels) away from the pupil (as discussed in the earlier embodiment), the at least one lightguide segment corresponding to said at least one group of pixels could be controlled in a manner that the light received from said pixels is directed towards the centre of the at least one lens. The technical benefit of directing the light towards the centre of the at least one lens is that it facilitates in minimising an occurrence of ghosting artifacts in images, thereby improving an overall visual quality of the images for displaying to the user. It will be appreciated that the at least one lens may be considered to be an eye lens that is capable of directing a projection of a visual scene towards the given eye, when the display apparatus is worn by the user. Optionally, the at least one lens is implemented as at least one of: a convex lens, a plano-convex lens, a Liquid Crystal (LC) lens, a liquid lens, a Fresnel lens, an aspherical lens, an achromatic lens, a polymeric lens, a freeform lens, a polariser, a mirror, a semi-transparent mirror, a polarising mirror, a diffractive optical element. Information pertaining how the gaze position is determined and how the at least one group of pixels is identified have been already discussed in the earlier embodiment.

Optionally, the pre-determined angle and/or the pre-determined angular distance are determined based on at least one of: an angular extent of the field of view of the light source, a distance between the light source and the at least one lens. In this regard, when the angular extent of the field of view of the light source is known, the at least one processor could easily ascertain an angle (with respect to the optical axis) above which the gaze direction of the given eye can be considered to be significantly away from the central region of the field of view, as the pre-determined angle. Similarly, when the angular extent of the field of view of the light source is known, the at least one processor could easily ascertain an angular distance (from the gaze position) above which a given pixel can be considered to be significantly far from the gaze position, as the pre-determined angular distance. In an example, the pre-determined angular distance with respect to the gaze position may be twice the orientation of the pupil with respect to the optical axis.

Furthermore, when the distance between the light source and the at least one lens is higher (namely, when a physical depth of the optical chamber is high), the light directed towards the pupil of the given eye would likely be straighter to reach the pupil (i.e., the light would not bend sharply when it is directed towards the pupil). On the other hand, when the distance between the light source and the at least one lens is lesser (namely, when the physical depth of the optical chamber is low), the light directed towards the pupil of the given eye would likely bend more sharply to reach the pupil. Thus, the at least one processor could take into account the distance between the light source and the at least one lens for determining the pre-determined angle and/or the pre-determined angular distance, by assuming that the at least one of: the gaze direction of the given eye, the position of the pupil, the orientation of the pupil, are determined from a perspective of the centre of the at least one lens.

The present disclosure also relates to the method as described above. Various embodiments and variants disclosed above, with respect to the aforementioned first aspect, apply mutatis mutandis to the method.

Optionally, in the method, the lightguide is implemented as a liquid-crystal (LC) device.

Optionally, in the method, the LC device comprises a first LC layer and a second LC layer, wherein the first LC layer, when addressed, directs light received thereat from a given pixel towards a first direction, and wherein the second LC layer, when addressed, directs light received thereat from the first LC layer towards a second direction, the second direction being orthogonal to the first direction.

Optionally, the method further comprises:

detecting when the orientation of the pupil is greater than a pre-determined angle;

when it is detected that the orientation of the pupil is greater than the pre-determined angle, determining a gaze position in the imaginary plane spanning across the field of view of the light source, based on the gaze direction of the given eye;

identifying at least one group of pixels of the light source whose pixels' angular distance from the gaze position is greater than a pre-determined angular distance; and controlling at least one lightguide segment corresponding to said at least one group of pixels to direct light, received from said at least one group of pixels, away from the pupil of the given eye.

Alternatively, optionally, the method further comprises:

detecting when the orientation of the pupil is greater than a pre-determined angle;

when it is detected that the orientation of the pupil is greater than the pre-determined angle, determining a gaze position in the imaginary plane spanning across the field of view of the light source, based on the gaze direction of the given eye;

identifying at least one group of pixels of the light source whose pixels' angular distance from the gaze position is greater than a pre-determined angular distance; and controlling at least one lightguide segment corresponding to said at least one group of pixels to direct light, received from said at least one group of pixels, towards a centre of at least one lens, wherein the at least one lens is arranged on the optical path of the light source, and wherein the lightguide is arranged between the light source and the at least one lens.

Optionally, in the method, the pre-determined angle and/or the pre-determined angular distance are determined based on at least one of: an angular extent of the field of view of the light source, a distance between the light source and the at least one lens.

Optionally, in the method, a group of pixels that corresponds to a given lightguide segment is in a form of M×N pixels, wherein M and N are integers that are larger than or equal to 8.

DETAILED DESCRIPTION OF THE DRAWINGS

Figure 2:
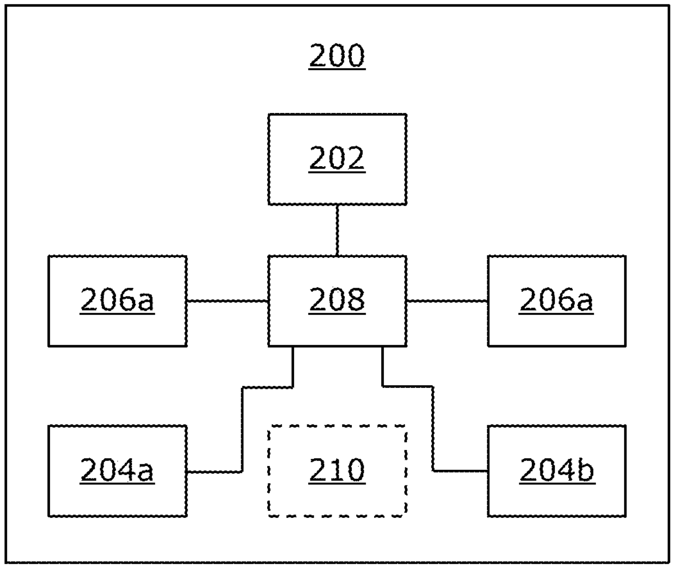
FIG. 2 illustrates a block diagram of architecture of a display apparatus incorporating dynamic lightguide for display, in accordance with an embodiment of the present disclosure.

Referring to FIG. 2, illustrated is a block diagram of architecture of a display apparatus 200 incorporating dynamic lightguide for display, in accordance with an embodiment of the present disclosure. The display apparatus 200 comprises gaze-tracking means 202, a light source per eye (for example, depicted as a light source 204*a* for a first eye and a light source 204*b* for a second eye), a lightguide per eye (for example, depicted as a lightguide 206*a* for the first eye and a lightguide 206*b* for the second eye), and at least one processor (for example, depicted as a processor 208). The processor 208 is communicably coupled to the gaze-tracking means 202, the light sources 204*a-b*, and the lightguides 206*a-b*. Optionally the display apparatus 200 further comprises at least one lens (for example, depicted as a lens 210). The processor 208 is configured to perform various operations, as described earlier with respect to the aforementioned first aspect.

It may be understood by a person skilled in the art that the FIG. 2 includes a simplified architecture of the display apparatus 200 for sake of clarity, which should not unduly limit the scope of the claims herein. It is to be understood that the specific implementation of the display apparatus 200 is provided as an example and is not to be construed as limiting it to specific numbers and types of gaze-tracking means, light sources, lightguides, processors, and lenses. The person skilled in the art will recognize many variations, alternatives, and modifications of embodiments of the present disclosure.

Figure 3:
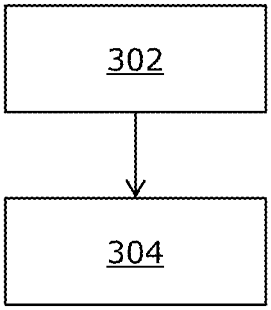
FIG. 3 illustrates steps of a method incorporating dynamic lightguide for display, in accordance with an embodiment of the present disclosure.

Referring to FIG. 3, illustrated are steps of a method for incorporating dynamic lightguide for display, in accordance with an embodiment of the present disclosure. At step 302, gaze-tracking data, collected by gaze-tracking means, is processed to determine at least one of: a gaze direction of a given eye of a user, a position of a pupil of the given eye relative to an imaginary plane that spans across a field of view of a light source per eye, an orientation of the pupil of the given eye relative to an optical axis of the field of view of the light source, wherein the light source has a plurality of pixels. At step 304, at least one of a plurality of lightguide segments of a lightguide per eye is controlled to direct light, received from a corresponding group of pixels of the light source, towards the pupil of the given eye, based on the at least one of: the gaze direction of the given eye, the position of the pupil, the orientation of the pupil, wherein the lightguide is arranged on an optical path of the light source, the lightguide comprising the plurality of lightguide segments that are individually controllable, wherein the plurality of lightguide segments correspond to a plurality of groups of pixels of the light source.

The aforementioned steps of the method are only illustrative and other alternatives can also be provided where one or more steps are added, one or more steps are removed, or one or more steps are provided in a different sequence without departing from the scope of the claims herein. It will be appreciated that the method is easy to implement and provides the simple implementation.

Figure 4:
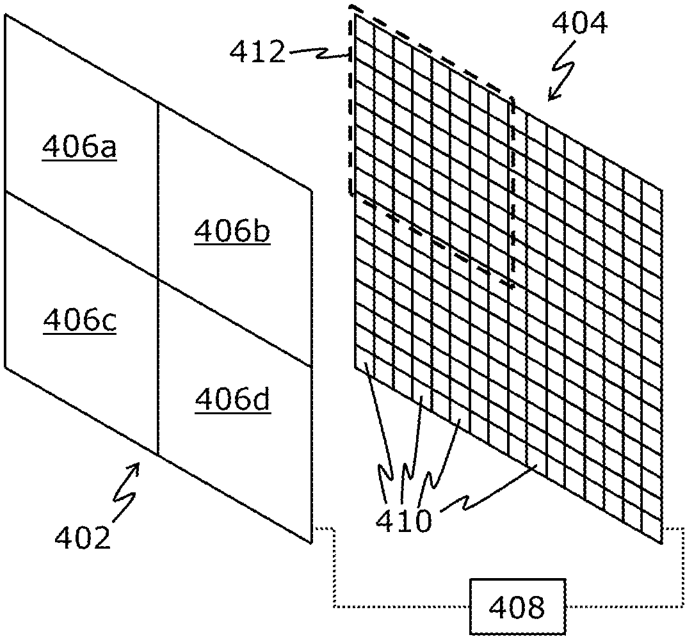
FIG. 4 illustrates an exemplary arrangement of a lightguide with respect to a light source, in accordance with an embodiment of the present disclosure.

Referring to FIG. 4, illustrated is an exemplary arrangement of a lightguide 402 with respect to a light source 404, in accordance with an embodiment of the present disclosure. With reference to FIG. 4, the lightguide 402 is shown to be arranged on an optical path of the light source 404. For sake of simplicity and better understanding, the lightguide 402 comprises four lightguide segments 406*a*, 406*b*, 406*c*, and 406*d* that are individually controllable by at least one processor (for example, depicted as a processor 408). Moreover, the light source 404 (for example, implemented as a display) is shown to comprise a plurality of pixels 410 (depicted as a 16×16 grid of pixels, for sake of simplicity). The light source 404 is communicably coupled with the processor 408. As shown, each of the lightguide segments 406*a-d* correspond to respective groups of pixels of the light source 404. For illustration purposes, a group 412 of pixels (depicted using a dashed-line box) is shown to correspond to the lightguide segment 406*a*, wherein said group 412 of pixels is in a form of 8×8 pixels.

Figure 5:
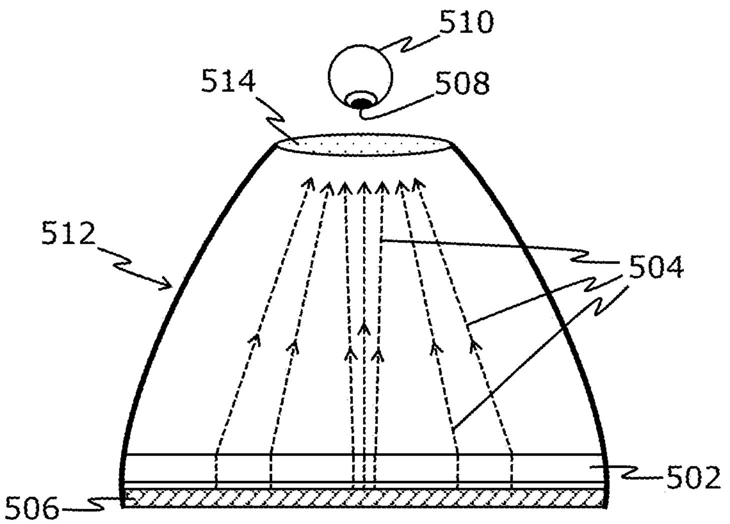
FIG. 5 illustrates an exemplary scenario of using a lightguide to direct light received from a light source towards a pupil of a given eye, in accordance with an embodiment of the present disclosure.

Referring to FIG. 5, illustrated is an exemplary scenario of using a lightguide 502 to direct light 504 (for example, depicted using dashed-line arrows) received from a light source 506 (depicted using a diagonal-brick pattern) towards a pupil 508 of a given eye 510, in accordance with an embodiment of the present disclosure. With reference to FIG. 4, for the given eye 510, an optical chamber 512 of a display apparatus is shown to comprise the lightguide 502, the light source 506, and a lens 514 (depicted using a dotted pattern). The lightguide 502 is shown to be arranged on an optical path of the light source 506, wherein a plurality of lightguide segments of the lightguide 502 correspond to a plurality of groups of pixels of the light source 506. At least some of the plurality of lightguide segments are controlled (by at least one processor) to direct the light 504, received from corresponding groups of pixels of the light source 506, towards the pupil 508 of the given eye 510, for example, based on a gaze direction of the given eye 510. As shown, the light 504 is directed towards a centre of the lens 514 to reach the pupil 508 of the given eye 510.

Figure 6:
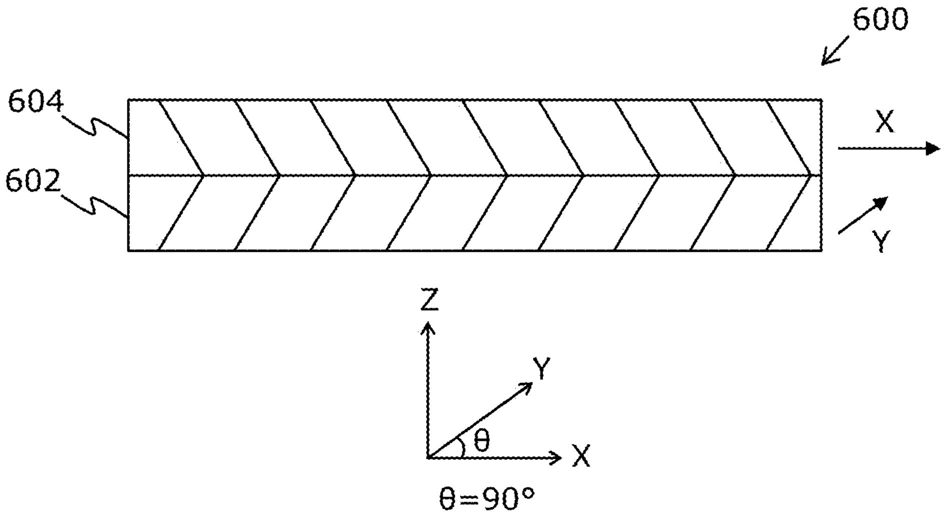
FIG. 6 illustrates an exemplary liquid-crystal device, in accordance with an embodiment of the present disclosure.

Referring to FIG. 6, illustrated is an exemplary liquid-crystal (LC) device 600, in accordance with an embodiment of the present disclosure. With reference to FIG. 6, the LC device 600 comprises a first LC layer 602 and a second LC layer 604 (depicted as differently hatched layers) that are individually addressable by at least one processor. A given layer of the LC device 600 is to be selectively addressed to direct light received thereat from a given pixel of a light source (not shown) or from a previous layer of the LC device 600 towards a given direction. The first layer 602, when addressed, directs light received thereat from the given pixel towards a first direction (depicted, for example, as a direction along an exemplary Y-axis). The second layer 604, when addressed, directs light received thereat from the first layer 602 in a second direction (depicted, for example, as a direction along an exemplary X-axis), the second direction being orthogonal to the first direction.

Figure 7A:
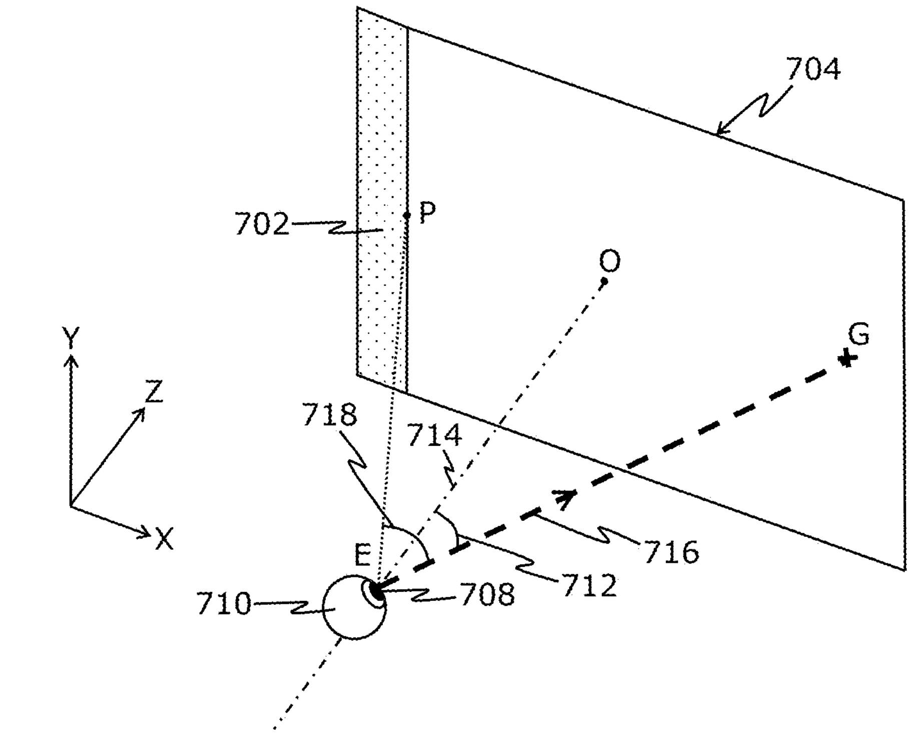
FIGS. 7A and 7B illustrates an exemplary scenario of identifying a group of pixels of a light source and directing light received from said group of pixels away from a pupil of a given eye, in accordance with an embodiment of the present disclosure.
Figure 7B:
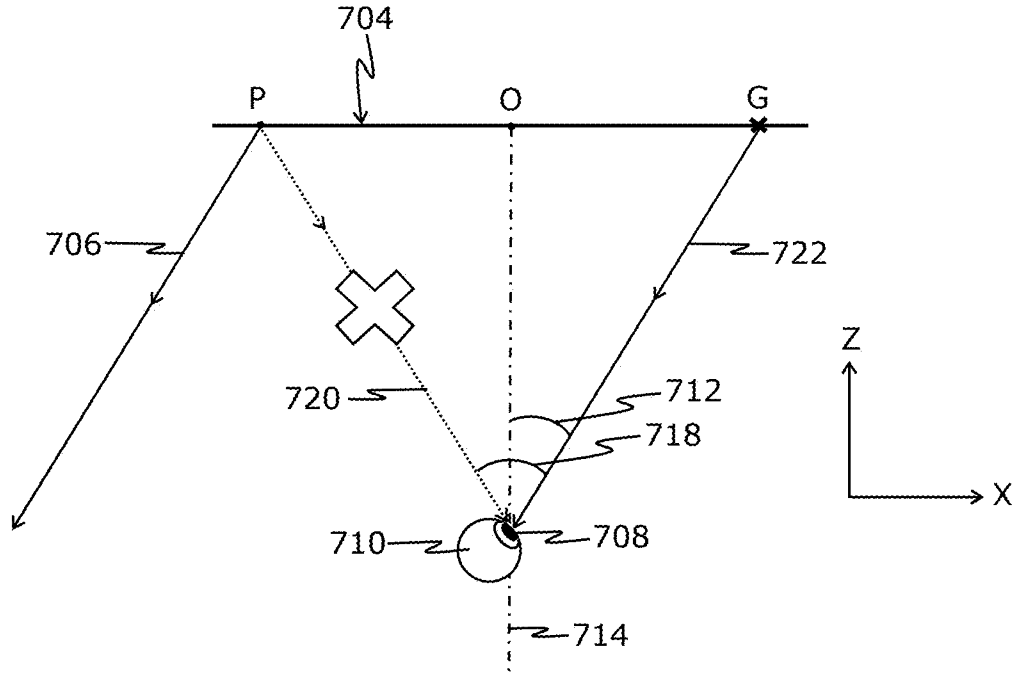

Referring to FIGS. 7A and 7B, illustrated is an exemplary scenario of identifying a group 702 of pixels (depicted using a dotted pattern) in a light source 704 and directing light 706 (depicted using a solid line with arrows) received from said group 702 away from a pupil 708 of a given eye 710, in accordance with an embodiment of the present disclosure.

For sake of clarity and better understanding, FIG. 7A depicts a perspective view of the exemplary scenario, whereas FIG. 7B depicts a top view of the exemplary scenario.

With reference to FIGS. 7A and 7B, it is detected (by at least one processor) that an orientation 712 of the pupil 708 (with respect to an optical axis 714 of the light source 704, passing through a centre O of the light source 704) is greater than a pre-determined angle. Moreover, a gaze position G is also determined corresponding to a gaze direction 716 of the given eye 710 that is gazing towards a periphery of the light source 704, in an imaginary plane spanning across a field of view of the light source 704. Then, it is identified that an angular distance 718 of the pixels belonging to the group 702 from the gaze position G is greater than a pre-determined angular distance. For sake of simplicity and clarity, the angular distance 718 is depicted as an angle between the gaze position G and a point P lying at a centre of an edge of the group 702. As shown, the optical axis 714 lies along a Z-axis (namely, a depth axis), and the gaze direction 716 lies along an X-axis.

With reference to FIG. 7B, at least one lightguide segment of a lightguide (that is arranged in front of the light source 704, but not shown in FIGS. 7A and 7B, only for sake of simplicity and tidiness) corresponding to the group 702 (as shown in FIG. 7A) is controlled (by the at least one processor) to direct the light 706 (depicted using a solid line with arrows), received from said group 702, away from the pupil 708 of the given eye 710. This is because since the pixels of said group 702 are considerably far from the gaze position, it would not be beneficial to receive light 720 (depicted using a dotted line with arrows which is crossed using an 'x' shape) emanating from said pixels towards the pupil 708 of the given eye 710, as the light 720 could travel in a grazing angle towards the pupil 708 and could cause unwanted reflections and ghosting effects in a corresponding part of an image being displayed at the light source 704. As an example, the light 706 may be directed away from the pupil 708 of the given eye 710 at an angle equal to or greater than the orientation 712 of the pupil 708, with respect to the optical axis 714. Furthermore, at least one other lightguide segment of the lightguide corresponding to a group of pixels that include the gaze position G is controlled (by the at least one processor) to direct light 722 (depicted using another solid line with arrows), received from said group, towards the pupil 708 of the given eye 710.

FIGS. 4, 5, 6, and 7A-7B are merely examples, which should not unduly limit the scope of the claims herein. A person skilled in the art will recognize many variations, alternatives, and modifications of embodiments of the present disclosure.

The invention claimed is:

1. A display apparatus comprising:
- gaze-tracking means;
- a light source, per eye having a plurality of pixels;
- a lightguide per eye arranged on an optical path of the light source, the lightguide comprising a plurality of lightguide segments that are individually controllable, wherein the plurality of lightguide segments correspond to a plurality of groups of pixels of the light source; and
- at least one processor configured to:
  - process gaze-tracking data, collected by the gaze-tracking means, to determine at least one of: a gaze direction of a given eye of a user, a position of a pupil of the given eye relative to an imaginary plane that spans across a field of view of the light source, an orientation of the pupil of the given eye relative to an optical axis of the field of view of the light source;
  - control at least one of the plurality of lightguide segments to direct light, received from a corresponding group of pixels of the light source, towards the pupil of the given eye, based on the at least one of: the gaze direction of the given eye, the position of the pupil, the orientation of the pupil;
  - detect when the orientation of the pupil is greater than a pre-determined angle;
  - when it is detected that the orientation of the pupil is greater than the pre-determined angle,
    - determine a gaze position in the imaginary plane spanning across the field of view of the light source, based on the gaze direction of the given eye;
    - identify at least one group of pixels of the light source whose pixels' angular distance from the gaze position is greater than a pre-determined angular distance; and
    - control at least one lightguide segment corresponding to said at least one group of pixels to direct light, received from said at least one group of pixels, away from the pupil of the given eye.

2. The display apparatus of claim 1, wherein the lightguide is implemented as a liquid-crystal (LC) device.

3. The display apparatus of claim 2, wherein the LC device comprises a first LC layer and a second LC layer, wherein the first LC layer, when addressed, directs light received thereat from a given pixel towards a first direction, and wherein the second LC layer, when addressed, directs light received thereat from the first LC layer towards a second direction, the second direction being orthogonal to the first direction.

4. The display apparatus of claim 1, further comprising at least one lens arranged on the optical path of the light source, wherein the lightguide is arranged between the light source and the at least one lens, wherein the at least one processor is configured to:
- detect when the orientation of the pupil is greater than a pre-determined angle;
- when it is detected that the orientation of the pupil is greater than the pre-determined angle,
  - determine a gaze position in the imaginary plane spanning across the field of view of the light source, based on the gaze direction of the given eye;
  - identify at least one group of pixels of the light source whose pixels' angular distance from the gaze position is greater than a pre-determined angular distance; and
  - control at least one lightguide segment corresponding to said at least one group of pixels to direct light, received from said at least one group of pixels, towards a centre of the at least one lens.

5. The display apparatus of claim 1, wherein the pre-determined angle and/or the pre-determined angular distance are determined based on at least one of: an angular extent of the field of view of the light source, a distance between the light source and the at least one lens.

6. The display apparatus of claim 1, wherein a group of pixels that corresponds to a given lightguide segment is in a form of M×N pixels, wherein M and N are integers that are larger than or equal to 8.

7. A method comprising:

processing gaze-tracking data, collected by gaze-tracking means, to determine at least one of: a gaze direction of a given eye of a user, a position of a pupil of the given eye relative to an imaginary plane that spans across a field of view of a light source per eye, an orientation of the pupil of the given eye relative to an optical axis of the field of view of the light source, wherein the light source has a plurality of pixels;

controlling at least one of a plurality of lightguide segments of a lightguide per eye to direct light, received from a corresponding group of pixels of the light source, towards the pupil of the given eye, based on the at least one of: the gaze direction of the given eye, the position of the pupil, the orientation of the pupil, wherein the lightguide is arranged on an optical path of the light source, the lightguide comprising the plurality of lightguide segments that are individually controllable, wherein the plurality of lightguide segments correspond to a plurality of groups of pixels of the light source;

detecting when the orientation of the pupil is greater than a pre-determined angle;

when it is detected that the orientation of the pupil is greater than the pre-determined angle, determining a gaze position in the imaginary plane spanning across the field of view of the light source, based on the gaze direction of the given eye;

identifying at least one group of pixels of the light source whose pixels' angular distance from the gaze position is greater than a pre-determined angular distance; and controlling at least one lightguide segment corresponding to said at least one group of pixels to direct light, received from said at least one group of pixels, away from the pupil of the given eye.

8. The method of claim 7, wherein the lightguide is implemented as a liquid-crystal (LC) device.

9. The method of claim 8, wherein the LC device comprises a first LC layer and a second LC layer, wherein the first LC layer, when addressed, directs light received thereat from a given pixel towards a first direction, and wherein the second LC layer, when addressed, directs light received thereat from the first LC layer towards a second direction, the second direction being orthogonal to the first direction.

10. The method of claim 7, further comprising:

detecting when the orientation of the pupil is greater than a pre-determined angle;

when it is detected that the orientation of the pupil is greater than the pre-determined angle, determining a gaze position in the imaginary plane spanning across the field of view of the light source, based on the gaze direction of the given eye;

identifying at least one group of pixels of the light source whose pixels' angular distance from the gaze position is greater than a pre-determined angular distance; and controlling at least one lightguide segment corresponding to said at least one group of pixels to direct light, received from said at least one group of pixels, towards a centre of at least one lens, wherein the at least one lens is arranged on the optical path of the light source, and wherein the lightguide is arranged between the light source and the at least one lens.

11. The method of claim 7, wherein the pre-determined angle and/or the pre-determined angular distance are determined based on at least one of: an angular extent of the field of view of the light source, a distance between the light source and the at least one lens.

12. The method of claim 7, wherein a group of pixels that corresponds to a given lightguide segment is in a form of M×N pixels, wherein M and N are integers that are larger than or equal to 8.

* * * * *